Jan. 28, 1930.　　　　　S. ORIOKA　　　　　1,745,313
ADJUSTABLE HEADLIGHT FOR AUTOMOBILES
Filed Jan. 16, 1928　　　2 Sheets-Sheet 1
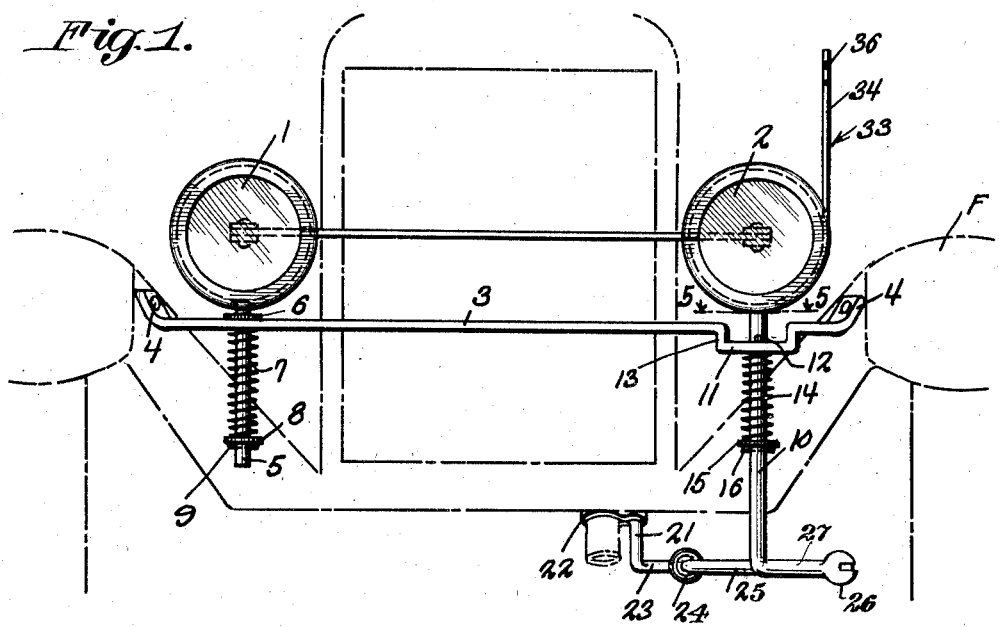
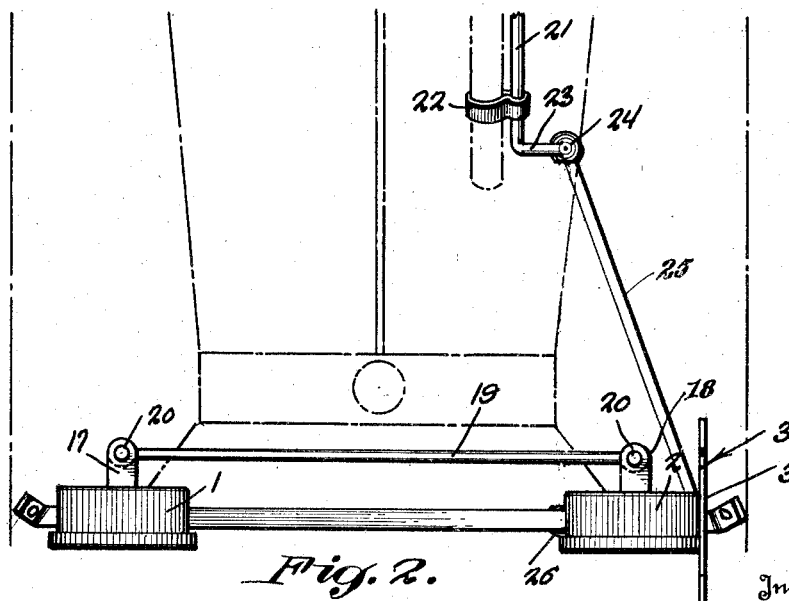
Inventor
Sadama Orioka

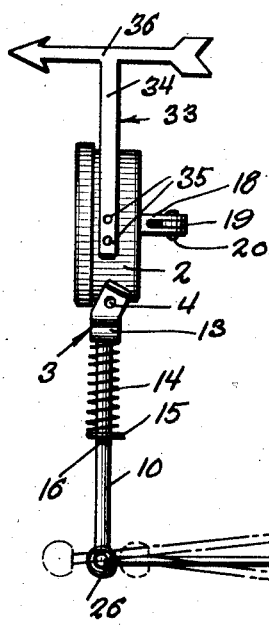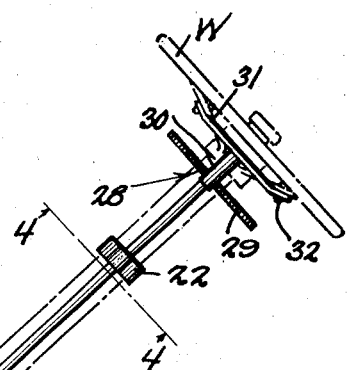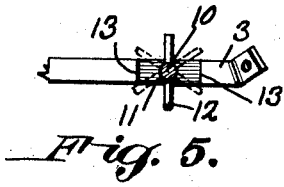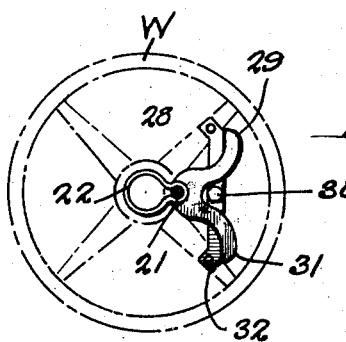

Patented Jan. 28, 1930

1,745,313

UNITED STATES PATENT OFFICE

SADAMA ORIOKA, OF HONOLULU, TERRITORY OF HAWAII

ADJUSTABLE HEADLIGHT FOR AUTOMOBILES

Application filed January 16, 1928. Serial No. 247,164.

This invention relates to improvements in the headlights of automobiles and has as its general object to provide means whereby the headlights may be automatically adjusted in accordance with operation of the steering mechanism of the automobile, so as to cause the light rays from the headlights to be directed onto the road surface while making turns, instead of to one side of the road, as where fixed headlights are employed.

Another object of the invention is to provide, in connection with headlights and means for adjusting the same automatically upon adjustment of the steering wheel, a signal, carried by one of the lights, to indicate the direction in which a turn is to be made, so that the drivers of other automobiles may be apprised of the intention of the driver of the automobile equipped with the devices of the present invention.

Another object of the invention is to provide an adjustable headlight mechanism which may be installed upon any of the various makes of automobiles and which will embody simple means, operable through rotative adjustment of the steering wheel of the automobile, for angularly adjusting the headlights so as to reflect the light rays therefrom onto the road surface over which the automobile is being driven, in making a turn in either dirtction, and in this connection the invention contemplates the provision of means for arresting the rotative adjustment of the headlights after they have been adjusted to a predetermined angular position, in either direction, ragardless of further rotative adjustment of the steering wheel, so that the mechanism embodying the invention is adapted for installation upon automobiles embodying steering mechanism in which there is a worm gear connection between the steering column and the radius rod between the wheels, as well as upon automobiles of the type in which there is a more or less direct connection between a crank arm at the lower end of the steering column and the radius rod which connects the wheels.

Another object of the invention is to so construct the device embodying the invention that there will be no likelihood of a disarrangement of the component parts thereof in travelling over rough roads or inequalities in a road surface, and which device will in no way interfere with the customary freedom of steering of the automobile.

Another object of the invention is to provide means for so mounting the adjustable headlights of the device of the invention as to insure against any undue freedom of movement of the headlight and, on the other hand, the invention contemplates the provision of means whereby the headlights may be continually steadied so that the light rays therefrom will at all times be properly directed onto the road surface.

While the accompanying drawings and the description which is to follow, constitute a disclosure of the preferred embodiment of the invention, it will be understood that various changes may be made within the scope of what is claimed.

In the accompanying drawings:

Figure 1 is a view in front elevation of the headlight structure embodying the invention;

Figure 2 is a top plan view thereof;

Figure 3 is a side elevation of the device, the view illustrating the steering wheel and steering column in broken lines and likewise illustrating, in broken lines, different positions of adjustment of the device;

Figure 4 is a transverse sectional view taken substantially on the line 4—4 of Figure 3 looking in the direction indicated by the arrows;

Figure 5 is a horizontal sectional view taken substantially on the line 5—5 of Figure 1 looking in the direction indicated by the arrows.

In the drawings the right and left headlights are indicated respectively by the numerals 1 and 2, and the means provided for supporting the headlights for angular adjustment includes a supporting bar 3 preferably of heavy bar metal which is bolted or otherwise secured at its ends as indicated by the numeral 4, to the downwardly sloping inner side portions of the front fenders F of the automobile. The headlight 1 is mounted at the upper end of a standard 5 which is rotatably fitted through an opening in the bar 3 near the right hand fender and upon the upper end of which the casing of the headlight is mounted, a collar 6 being provided upon the standard and resting in engagement with the upper side of the bar 3 as clearly shown in Figure 1 of the drawings. In order to prevent undue upward displacement of the standard 5 through the opening in the bar 3 in which it is mounted, and to steady the headlight 1, a compression spring 7 is fitted onto the standard 5 and bears at its upper end against the under side of the said bar 3 and at its lower end against a collar 8 which is fitted to the standard 5 and is supported by a cotter pin 9 which is fitted through the lower end portion of the standard, the spring 7 being placed under suitable tension, at the time of its application to the standard 5, to maintain the headlight 1 steadied and likewise steady the rotary adjustment of the standard 5 by the means which will presently be described.

The left headlight 2 is mounted at the upper end of a standard 10 which corresponds in some respects to the standard 5 and which is rotatably fitted through an opening formed in a depressed portion 11 of the supporting bar 3, a pin 12 being fitted diametrically through the said standard 10 and resting upon the upper side of the depresed portion 11 of the said bar 3 and being engageable at its end portions with the portions of the bar 3 which are indicated by the numeral 13 and which connect the depressed portion 11 with the remainder of the bar. The engagement of the end portions of the pin 12 with the portions 13 of the bar 3 is most clearly shown in Figure 5 of the drawings in which figure the pin is shown in full lines in the position which it will occupy when the headlight 2 is presented directly forwardly, the pin, in this position of the headlight, extending in a direct front to rear direction and being out of engagement at its end portions with the portions 13 of the bar 3. However, as will be evident from the dotted line positions shown in Figure 5 of the drawings, rotary adjustment of the standard 10 in either direction will result in the end portions of the pin 12 being brought into engagement with diagonally opposite vertical edges of the said portions 13, and therefore such engagement of the end portions of the pin 12 with the portions 13 of the bar 3 will serve to limit the angular adjustment of the headlight 2. The purpose of providing for limitation of the angular adjustment of the headlight 2 or in other words rotative adjustment of the standard 10 upon which it is mounted, will presently be explained. In the instance of the headlight 2, the standard 10 therefor is provided with a compression spring 14 corresponding to the spring 7 and this spring bears at its upper end against the under side of the depressed portion 11 of the bar 3 and at its lower end against a collar 15 corresponding to the collar 8 and supported by a cotter pin 16 which is secured through the standard 10 and which corresponds to the pin 9 previously described.

Rotary adjustment of the standard 10 to effect adjustment of the headlight 2 is provided for by a means which will presently be described, and in order that adjustment of the headlight 2 may effect corresponding angular adjustment of the headlight 1, brackets 17 and 18 are provided upon the rear sides of the headlights 1 and 2 respectively, and a radius rod 19 extends between these brackets and is pivotally connected at its ends by pivot bolts 20 to the said brackets.

The adjusting means referred to above includes a shaft 21 which is mounted in suitable bearing members 22 which are disposed to fit about the casing for the steering column at the upper end of which the steering wheel, indicated by the reference letter W, is mounted, and this shaft is provided at its lower end with a crank arm 23 terminating in a socket 24 in which is mounted a ball at the rear end of a connecting rod 25, the rod, at its forward end, being provided with a ball which is mounted in a socket 26 similar to the socket 24 and located at the outer end of a crank arm 27 provided at the lower end of the standard 10. At this point, and by reference to Figure 3 of the drawings, it will be evident that upon rotation of the shaft 21, a thrust or pull will be exerted upon the rod 25, depending upon the direction in which the shaft is rotated, thus acting upon the crank arm 27 at the lower end of the standard 10 so as to correspondingly rotatably adjust the said standard and thus angularly adjust the position of the headlight 2 and consequently the angular position of the headlight 1, due to the connection 19 between the said headlights.

In order that the shaft 21 may be rotatably adjusted, upon adjustment of the steering wheel W, a yoke 28 is mounted at the upper end of the shaft 21 and includes oppositely extending or diverging, outwardly curved arms 29, the arms having their convex edges presented outwardly and in position to coact with a stud 30 which projects downwardly from an attaching bracket member 31 which is arranged to extend between two of the spokes of the steering wheel W and is secured thereto by means of bolts 32 or other suitable securing elements.

From the foregoing description of this portion of the invention, it will be evident that upon rotative adjustment of the steering wheel W to adjust the front wheels of the automobile so as to change the direction of travel of the automobile, the initial rotary motion of the wheel W will result in the stud 30 riding against one or the other of the arms 29 of the yoke 28, along the convex edge of said arm, and in this manner rotative adjustment of the shaft 21 is effected so as to swing the crank arm 23 in a direction to exert a pull or thrust upon the rod 25, depending upon the direction of rotative adjustment of the shaft 21, and thus, in turn, effect angular adjustment of the headlights 1 and 2, through the medium of the means heretofore described. It will be evident, at this point, that continued rotative adjustment of the steering wheel W to effect proper steering of the automobile, will result in the stud 30 riding out of engagement with the arm 29 of the yoke 28 with which it has been brought into coactive contact, and therefore the presence of the device embodying the invention does not in any way interfere with proper operation of the steering wheel and the steering mechanism controlled thereby. Also it will be understood that due to the provision of the springs 7 and 14 upon the standards 5 and 10 respectively, the headlights 1 and 2 are suitably tensioned so as to prevent any free angular displacement thereof, and, furthermore, the engagement of the ends of the pin 12 with the portions 13 of the depression 11 in the bar 3 will serve effectually to arrest the angular displacement of the headlight 2, and consequently the headlight 1, when the headlights have been adjusted to such position that the light rays therefrom will be directed onto the curved stretch of roadway.

In order that the driver of the automobile equipped with the devices of the present invention may be relieved of the necessity of signalling with his left arm extended, to indicate the direction in which he is to make a turn, a signal member is preferably mounted upon the left headlight 2 and is indicated in general by the numeral 33 and comprises an upright standard portion 34 which is riveted or otherwise secured at its lower end as at 35 to the headlight casing 2, and an arrow shaped signal head 36, which is provided at the upper end of the said standard, the standard and signal head normally occupying a vertical plane parallel to the axis of the headlight 2, so that the arrow will normally point in a forward direction, but, upon adjustment of the headlight 2 in the manner heretofore described, so as to direct the rays from it and the headlight 1 either toward the right or toward the left, the signal member 33 will be correspondingly adjusted so that the arrow or signal head 36 will point in the corresponding direction.

Having thus described the invention, what I claim is:

1. In headlight adjusting mechanism for automobiles, rotatably adjustable headlight standards, headlights supported thereby, means extending between the headlights and connecting the same for adjustment in unison, a shaft, means for rotatably mounting the shaft upon the steering column of an automobile, operative connection between the shaft and one of the headlight standards for effecting rotative adjustment of the said headlight standard upon rotative adjustment of the shaft, means for positively limiting the rotative adjustment of said standard in either direction, a yoke carried by the standard, a bracket member for attachment to the steering wheel, and a stud member extending from the bracket member and operating between the arms of the yoke whereby to effect rocking of said shaft upon rotative adjustment of the steering wheel.

2. In headlight adjusting mechanism for automobiles, a rotatably adjustable headlight supporting standard, steering wheel actuated means for adjusting the standard, the said means comprising a rotatably adjustable shaft, operative connection between the shaft and standard, a yoke carried by the shaft and having diverging arms, and a stud member having means for attaching the same to the steering wheel of the automobile and working between said arms of the yoke, the effective edges of the arms being convexly curved whereby to provide for sweeping of said stud member over said edges and out of engagement with the arms of the yoke after a predetermined travel of the stud member, means for positively limiting the rotative adjustment of said standard in either direction after a predetermined rotative movement thereof and active substantially at the time the stud member moves out of engagement with either arm of the yoke, and a compression spring upon the standard, a bearing for the standard, and an abutment upon the standard, the compression spring bearing at its ends against the said bearing and against the said abutment and constituting means for holding the standard in the position to which it has been rotated.

In testimony whereof I affix my signature.

SADAMA ORIOKA.